United States Patent [19]
Phelps

[11] Patent Number: 5,966,729
[45] Date of Patent: Oct. 12, 1999

[54] SNOOP FILTER FOR USE IN MULTIPROCESSOR COMPUTER SYSTEMS

[75] Inventor: Andrew E. Phelps, Encinitas, Calif.

[73] Assignee: Sun Microsystems, Inc., Palo Alto, Calif.

[21] Appl. No.: 08/885,007

[22] Filed: Jun. 30, 1997

[51] Int. Cl.$^6$ .................................................. G06F 12/12
[52] U.S. Cl. ......................................... 711/146; 711/124
[58] Field of Search .................................. 711/119, 124, 711/141, 144, 145, 146

[56] References Cited

PUBLICATIONS

Bilir et al., "Multicast Snooping: A New Coherence Method Using a Multicast Address Network", Computer Sciences Department, University of Wisconsin–Madison.
Andrews et al., "Notification and Multicast Networks for Synchronization and Coherence", Journal of Parallel and Distributed Computing vol. 15, 1992, pp. 332–350.
Censier et al., "A New Solution to Coherence Problems in Multicache Systems", IEEE Transactions on Computers, vol. C–27, No. 12, Dec. 1978, pp. 1112–1118.
Lenoski et al., "The Stanford Dash Multiprocessor", IEEE, Mar. 1992, pp. 63–79.
Scott et al., "Performance of Pruning–Cache Directories for Large–Scale Multiprocessors", IEEE Transactions on Parallel and Distributed Systems, vol. 4, No. 5, May 1993, pp. 520–534.
Gupta et al., "Reducing Memory and Traffic Requirements for Scalable Directory–Based Cache Coherence Schemes", 1990 International Conference on Parallel Processing, Aug. 13–17, 1990, pp. I312–I321.
Mukherjee et al., "An Evaluation of Directory Protocols for Medium–Scale Shared–Memory Multiprocessors", The 1994 International Conference on Supercomputing, Jul. 11–15, 1994, pp. 64–74.
Goodman, James, "Using Cache Memory to Reduce Processor–Memory Traffic", The 10$^{th}$ Annual International Symposium on Computer Architecture, pp. 124–131.
Stenstrom, Per, "A Cache Consistency Protocol for Multiprocessors with Multistage Networks", The 16$^{th}$ Annual International Symposium on Computer Architecture; Computer Architecture News, vol. 17, No. 3, Jun. 1989, pp. 407–415.
Lenoski et al, "The Directory–Based Cache Coherence Protocol for the DASH Multiprocessor", 1990, IEEE, pp. 148–159.
Agarwal et al., "An Evaluation of Directory Schemes for Cache Coherence", 1988, IEEE, pp. 280–289.

*Primary Examiner*—Eddie P. Chan
*Assistant Examiner*—Kevin L. Ellis
*Attorney, Agent, or Firm*—Beyer & Weaver, LLP

[57] ABSTRACT

An improved method and apparatus for distributing transactions among a plurality of groups of processors in a multiprocessor computer system are disclosed. An embodiment of the invention includes the following operations. First, receiving an address request at a first group of processors. The address request is associated with a memory address corresponding to a requested memory page. Next, identifying those of the groups of processors that are interested in the address request and identifying those of the groups of processors that are uninterested in the address request. Thereafter, substantially simultaneously broadcasting the address request to the interested groups of processors and not to the uninterested groups of processors.

20 Claims, 10 Drawing Sheets

SNOOP FILTER FOR USE IN MULTIPROCESSOR COMPUTER SYSTEMS

BACKGROUND OF THE INVENTION

1. Field of the Invention

The present invention relates to multi-processor computer systems and, more particularly, to the processing of memory access requests within a multi-processor computer system.

2. Description of the Related Art

Although computation speeds of conventional processors have increased dramatically, there is still a need for even faster computing. Large computational problems such as weather forecasting, fusion modeling, and aircraft simulation demand substantial computing power, far in excess of what can currently be supplied. While processor speed is improving as device speeds increase, the achieved performance levels are still inadequate to handle computationally complex problems.

To achieve high performance computing, a plurality of individual processors have been interconnected to form a multiprocessor computer system capable of providing parallel processing.

In a multiprocessor computing system, there are two sources of delay in satisfying processor memory requests. The first source of delay is the access time to the main memory, and the second source of delay is the communications delays imposed by an interconnection network that connects the various processors. If the bandwidth of the interconnection network is inadequate, the communication delays are greatly increased due to contention for the bandwidth.

One suggested solution to both the bandwidth and access time limitations of interconnection networks is the use of private caches memories at the individual processors. By properly selecting cache parameters, both the transfer ratios (the ratio of memory requests passed on to the main memory from the cache to initial requests made of the cache) and effective access times can be reduced. Unfortunately, private caches introduce a stale data problem (or multicache coherency problem) due to the multiple copies of main memory locations which may be present.

Another suggested solution involves the use of coherency directories. Coherency directories are generally large, separate blocks of memory which keep track of which processor in the multiprocessor computer system owns which lines of memory. Unfortunately, coherency directories can be expensive since additional memory is required and slow since coherency directories are typically structured in a table lookup format. Coherency directories can also severely degrade overall system performance since a memory call must be initiated for every address request.

More recently, shared memory multiprocessing system have interconnected processors (or groups of processors) by a single bus (e.g., an address bus). Unfortunately, as the processor speeds increase, the feasible number of processors that can be connected through a single bus decreases. One problem with using a bus is that performance degrades as more devices are added to the bus. This means that the bandwidth of a bus available to a processor actually shrinks as more processors are added to the bus.

Figure 1A:
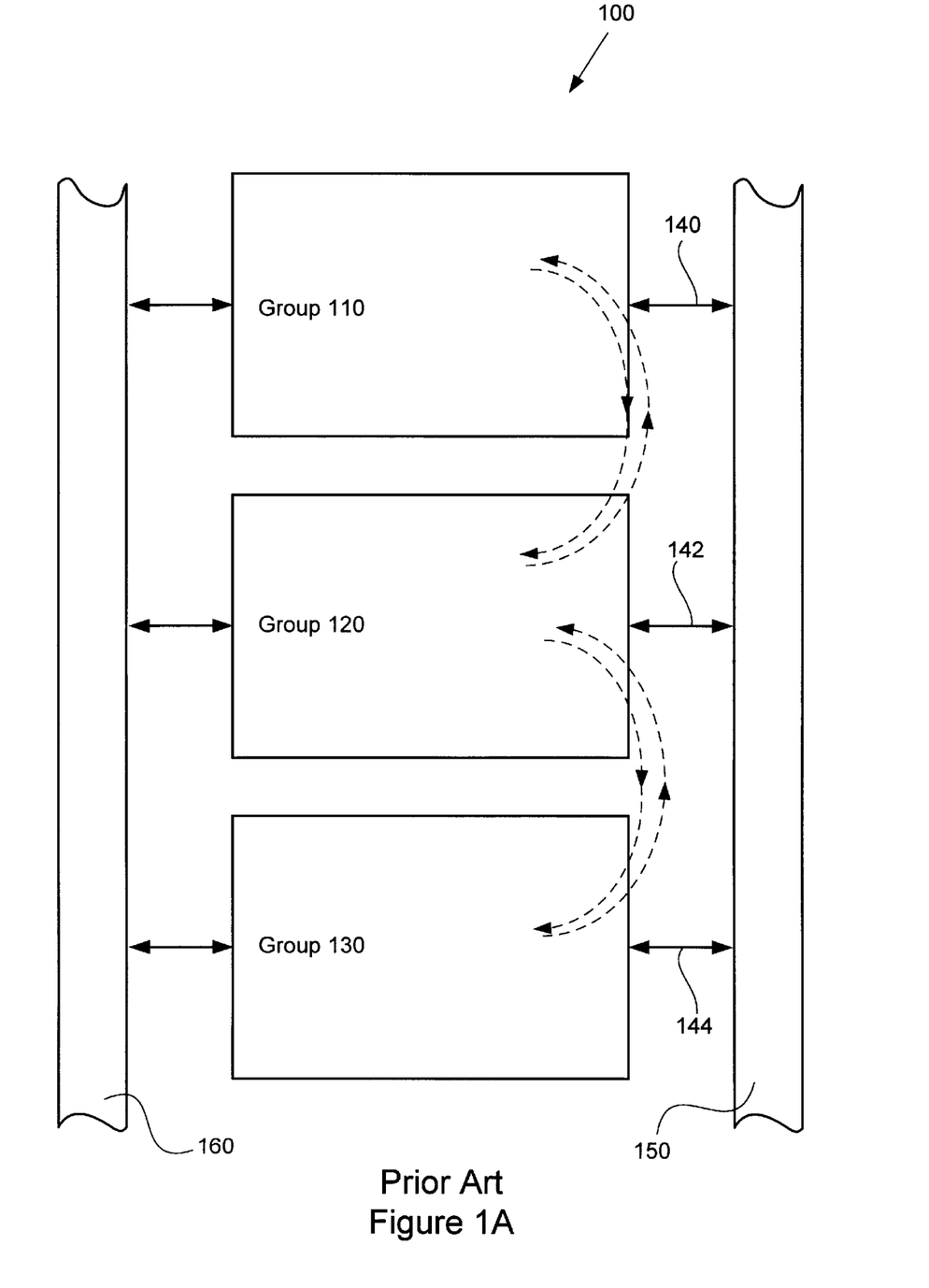
FIG. 1A is a block diagram of a portion of a conventional multiprocessor computer system.

FIG. 1A is a block diagram of a portion of a conventional multiprocessor computer system 100 illustrating typical snoop result paths between various processor groups. Computer system 100 includes a first processor group 110, a second processor group 120, a third processor group 130, an address interconnect 150, and a data interconnect 160. It should be noted whereas only three (3) processor groups are shown in FIG. 1, multiprocessor computer system 100 typically includes any suitable number of processor groups. Communication between the processor 110, 120 and 130 are provided by way of bidirectional buses 140 and 142. Each of processor groups 110, 120, and 130 includes a snoop results distributor and an address repeater. The address repeaters are used to communicate with address interconnect 150 by way of bidirectional buses 140 and 142. Generally, address interconnect 150 broadcasts address requests to every address repeater within computer system 100 whereas data interconnect 160 operates as a point to point router.

In operation, processor groups 110, 120 and 130 transmit their respective memory address requests directly to address interconnect 150. Address interconnect 150 will arbitrate any conflicting address requests and will simultaneously broadcast back to all groups of processors (including the original requester group) within system 100 the chosen requested address request. Once received, each processor group will generate and store a group snoop result in its own snoop results distributor. Each group's snoop results distributor will then broadcast to all other snoop results distributors in every processor group in system 100 their respective group snoop result. In this manner, every processor group within computer system 100 obtains the group snoop results of every other processor group. Thereafter, the processor group initiating the address request is directed to the appropriate memory location within the computer system 100. A conventional multiprocessor system utilizing a snoop system having such a snoop results distributor is exemplified by the STARFIRE system manufactured by Sun Microsystems, Inc. of Mountain View, Calif.

Figure 1B:
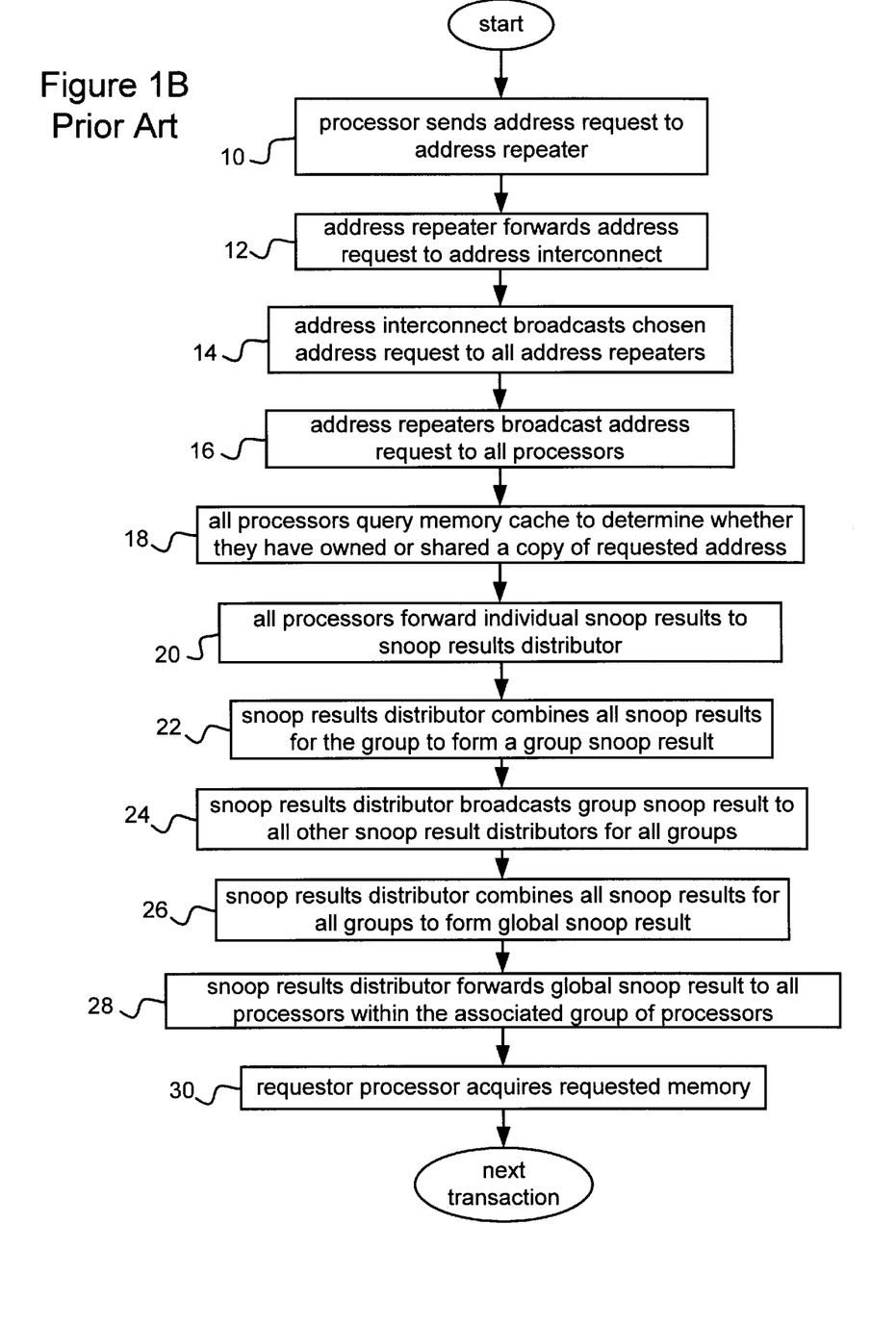
FIG. 1B is a flowchart illustrating a typical memory request transaction in a conventional multiprocessor computer system.

FIG. 1B is a flowchart illustrating a typical memory address request transaction in the conventional multiprocessor computer system 100 shown in FIG. 1A.

The conventional multiprocessor computer system memory address request transaction process 150 begins with an individual processor sending 10 an address request to the associated address repeater. As is known to those skilled in the art, at least one processor in a processor group will typically generate an address request to seek a specific block of memory. An address request typically will be associated with a specific memory command indicative of the purpose for which the block of memory is being requested by the processor. The address requester will forward 12 the received address request to the address interconnect associated with conventional multiprocessor computer system 100. The address interconnect, after appropriate conflict arbitration, will broadcast 14 the chosen address request to all address repeaters included within conventional multiprocessor computer system 100, including the address repeater associated with the original requester group of processors. Each associated address repeater will broadcast 16 the received address request to each of its associated individual processors. Each individual processor will in turn query 18 their respective memory cache to determine whether they have owned or shared a copy of the requested memory address. Based on the determining 18, each processor will generate an individual snoop result which is subsequently forwarded 20 to the snoop results distributor associated with the group of processors. The snoop results distributor then combines 22 all individual snoop results received from individual processors to form a group snoop result. The snoop result distributor then broadcasts 24 the group snoop result to all other snoop results distributors within computer system 100 since each snoop results distributor is capable of broadcasting and receiving the group snoop result from all other groups of processors within system 100.

Each snoop result distributor will combine 26 the group snoop results received from all other snoop results distributors within computer system 100 to form a global snoop result. The global snoop result contains all information relating to the ownership of the page of memory associated with the requested memory address for all groups of processors within system 100. Each snoop result distributor will forward 28 the global snoop result to all individual processors within its associated group of processors. Upon receipt of the global snoop result, the original requester processor will obtain 30 the requested page of memory.

As the number of processors added to the computer system increases, the amount of irrelevant data on the address bus degrades overall system performance. By way of example, as more processors are added to the computer system, at some point the maximum address bandwidth precludes any improvement in overall system performance at which no additional performance gained by adding more processors.

Thus, there is a need for techniques to reduce transmission of address requests between various processors in a multiprocessor computer system.

SUMMARY OF THE INVENTION

Broadly speaking, the invention relates to an improved method and apparatus for distributing address requests among a plurality of groups of processors in a multiprocessor computer system. According to the invention, an address request is broadcast to only those groups of processors interested in a requested page of memory. In this manner, the address bandwidth necessary for the distribution of the address request is correspondingly reduced.

The invention can be implemented in numerous ways, including as a method, a computer system, and an apparatus. Several embodiments of the invention are discussed below.

As a method for distributing address requests among a plurality of groups of processors in a multiprocessor computer system, an embodiment of the invention includes the operations of: receiving an address request at a first group of processors, the address request being associated with a memory address corresponding to a requested memory page; identifying those of the groups of processors that are interested in the address request; and substantially simultaneously broadcasting the address request to the interested groups of processors and not to uninterested groups of processors.

As a multiprocessor computer system, one embodiment of the invention includes a plurality of groups of processors. The plurality of groups of processors includes a first group of processors which receives an address request associated with a memory address corresponding to a requested memory page, an interested group of processors being those of the groups of processors that are interested in the address request, and an uninterested group of processors being those of the groups of processors that are not interested in the address request. The multiprocessor computer system further includes a plurality of address repeaters each of which is associated with one of the groups of processors and is capable of receiving and broadcasting an address request. The computer system also includes a plurality of snoop filters each being associated with one of the group of processors and each being capable of identifying the interested groups of processors and the uninterested groups of processors. Still further, the computer system includes an address interconnect being electrically connected to each of the snoop filters associated with each of the group of processors. The address interconnect is capable of substantially simultaneously broadcasting the address request to the interested groups of processors and not to the uninterested groups of processors.

In yet another embodiment, a multiprocessor computer system includes: a plurality of processing elements, a shared resource which is shared by the processing elements, a bus interconnecting the processing elements and the shared resource, and a traffic filter. The traffic filter reduces traffic operates to reduce traffic over the bus in the multiprocessor computer system.

The advantages of the invention are numerous. One advantage of the invention is the address interconnect bandwidth is less likely to hinder overall system performance. Another advantage of the invention is that an address interconnect is able to service address requests for large numbers of processors or groups of processors. Another advantage of the invention is the ability to concurrently distribute multiple address requests.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to an improved method and apparatus for distributing address requests among a plurality of groups of processors in a multiprocessor computer system. According to the invention, an address request is broadcast to only those groups of processors interested in the requested page of memory. In this manner, the address bandwidth necessary for the distribution of the address request is correspondingly reduced. In this discussion, a "group of processors" may be any number of processors which share one board (e.g., printed circuit board), or may be any subset of the total processors included in the computer system. As examples, in a twelve (12) processor system, the processors could be grouped as four groups of three processors, 12 groups of one processor, to name a few examples. Of course, each group of processors need not contain the same number of processors.

In one embodiment of the invention, a snoop filter enables a centralized broadcaster to recognize those groups of processors which are interested and those groups of processors which are not interested in a transaction. The snoop filter can be a separate integrated circuit chip or integral to another integrated circuit chip or chips of the computer system.

An interested group of processors are those that have performed an operation upon the requested block (e.g,; page or line) of memory. In another embodiment, a group of processors may be interested in the requested block of memory if any processors in that group made a request to obtain a cached copy of any line in the requested block of memory. In still another embodiment, a group of processors is interested in the requested block of memory if any processor in that group is interested in the requested block of memory. By way of example, a Read to Own operation is an operation in which the requester processor wishes to write to or otherwise modify the block of memory associated with the requested memory address. Since the content of the requested block of memory will be altered, all processors with a cached copy of the requested block of memory invalidate their copy of the requested block of memory, after first delivering a copy of the block of memory to the requesting processor if it is the only valid copy. The memory controller will direct the memory to deliver its copy if the global snoop results indicate that memory's copy is valid. Another example of a relevant memory operation is Read to Share. A Read to Share is an operation in which a requester processor wishes to only read a requested page of memory but does not preclude other valid copies of the requested block of memory in other processor's caches or in memory.

Embodiments of the invention are discussed below with reference to FIGS. 2–7C. However, those skilled in the art will readily appreciate that the detailed description given herein with respect to these figures is for explanatory purposes as the invention extends beyond these limited embodiments.

Figure 2:
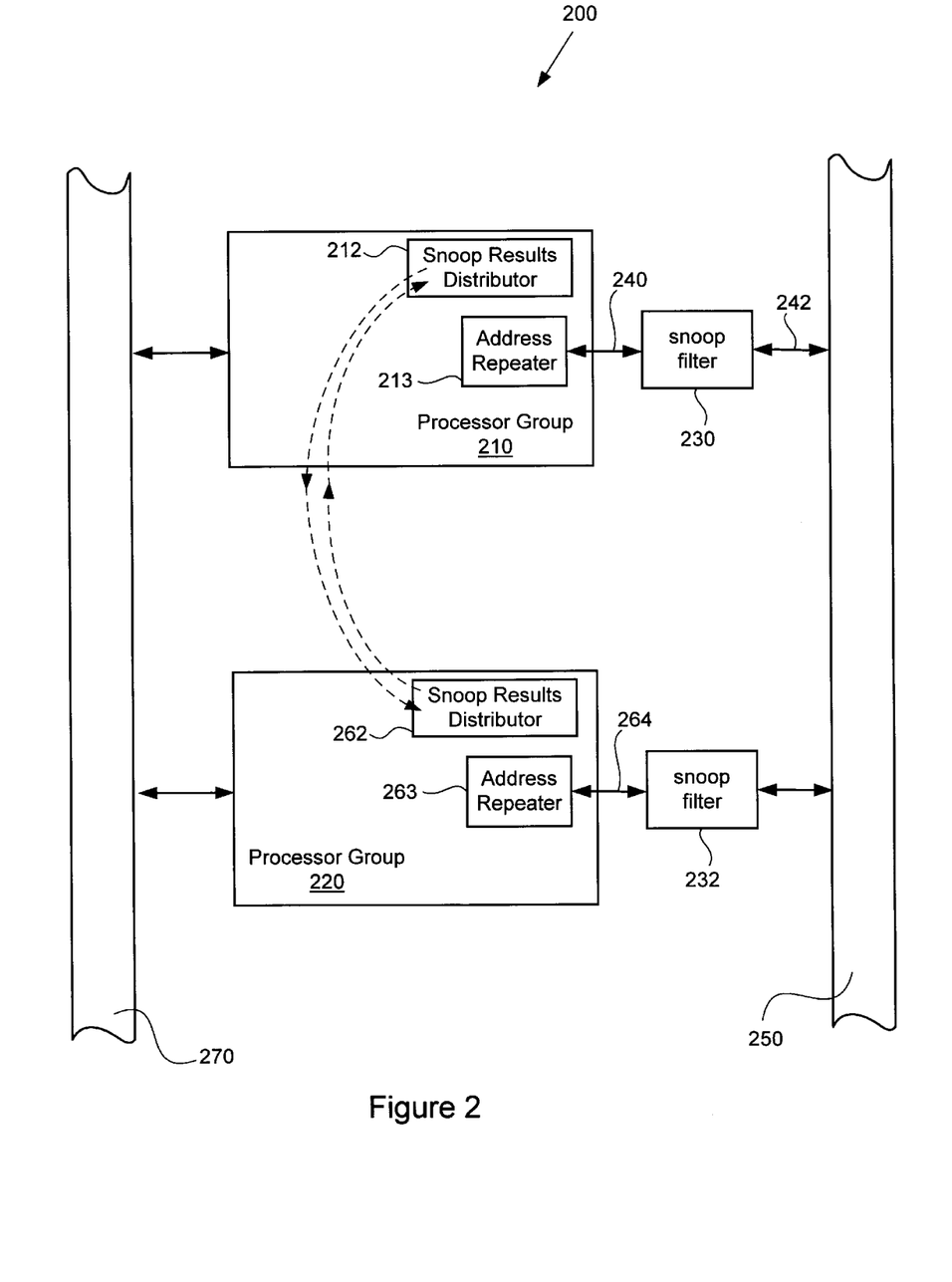
FIG. 2 is a block diagram of a multiprocessor computer system having processor groups with associated snoop filters according to an embodiment of the invention.

FIG. 2 is a block diagram of a multiprocessor computer system 200 according to an embodiment of the invention. The multiprocessor computer system 200 includes a plurality of processor groups, namely at least processor group 210 and processor group 220. In this depicted embodiment, the processor group 210 has an associated snoop filter 230 and the processor group 220 has an associated snoop filter 232. Typically, the processor group 210 includes a plurality of processors. However in general, a processor group includes one or more processing elements. In this embodiment, processor group 210 includes an address repeater 213 and a snoop results distributor 212. Address repeater 213 forwards an address request received at processor group 210 to snoop filter 230 by way of a address repeater bus interface 240. Likewise, processor group 220 includes an address repeater 263, a snoop results distributor 262, which operate similarly.

The snooping operations performed by the computer system 200 are described with reference to processor group 210, as normally all processor groups operate similarly. Snoop filter 230 is capable of receiving the address request and generating an appropriate output command. Snoop filter 230 will then forward the output command to address interconnect 250 by way of a bus interfaces 242. Generally, address interconnect 250 broadcasts transactions (e.g., transaction requests) to every address repeater included within computer system 200 whereas data interconnect 270 operates as a point to point router or a bus.

All processor groups within computer system 200 forward their individual address requests to address interconnect 250. A central address arbiter (not shown) included in address interconnect 250 then selects an address request from those address requests received at the address interconnect 250 based upon an appropriate arbitration algorithm. The selected address request (along with the associated command and memory page address) will then be broadcast substantially simultaneously by address interconnect 250 to the snoop filters for all interested processor groups concurrently with the broadcasting of another non-conflicting address request to the snoop filters of any uninterested processor groups.

The snoop filter associated with each group of processors will subsequently forward the selected address request and command to the associated address repeater for each interested processor groups. Each of the address repeater will then in turn forward the selected address request and command to all individual processors within the associated group of processors. By way of example, snoop filter 230 receives the selected address request and command and thereafter forwards the same to processor group 210 by way of associated address repeater 213.

According to the described embodiment, the individual processors included in processor group 210 will then generate individual snoop results by querying their own memory caches to determine whether they have a copy of the requested memory page, In another embodiment the individual processors included in processor group 210 will generate individual snoop results by querying their own memory caches to determine whether they have a copy of any line of memory associated with the requested memory page. Thereafter, each processor within processor group 210 will forward its snoop result to the snoop results distributor 212 for the processor group wherein all such individual snoop results will be cumulated into a group snoop result. Snoop results distributor 212 next broadcasts the group snoop results from processor group 210 to all snoop results distributors in system 200. Snoop results distributor 212 is also able to receive group snoop results from other snoop results distributors in computer system 200 and to accumulate them into a global snoop result. The global snoop result contains snoop information for all processors in system 200.

Figure 3:
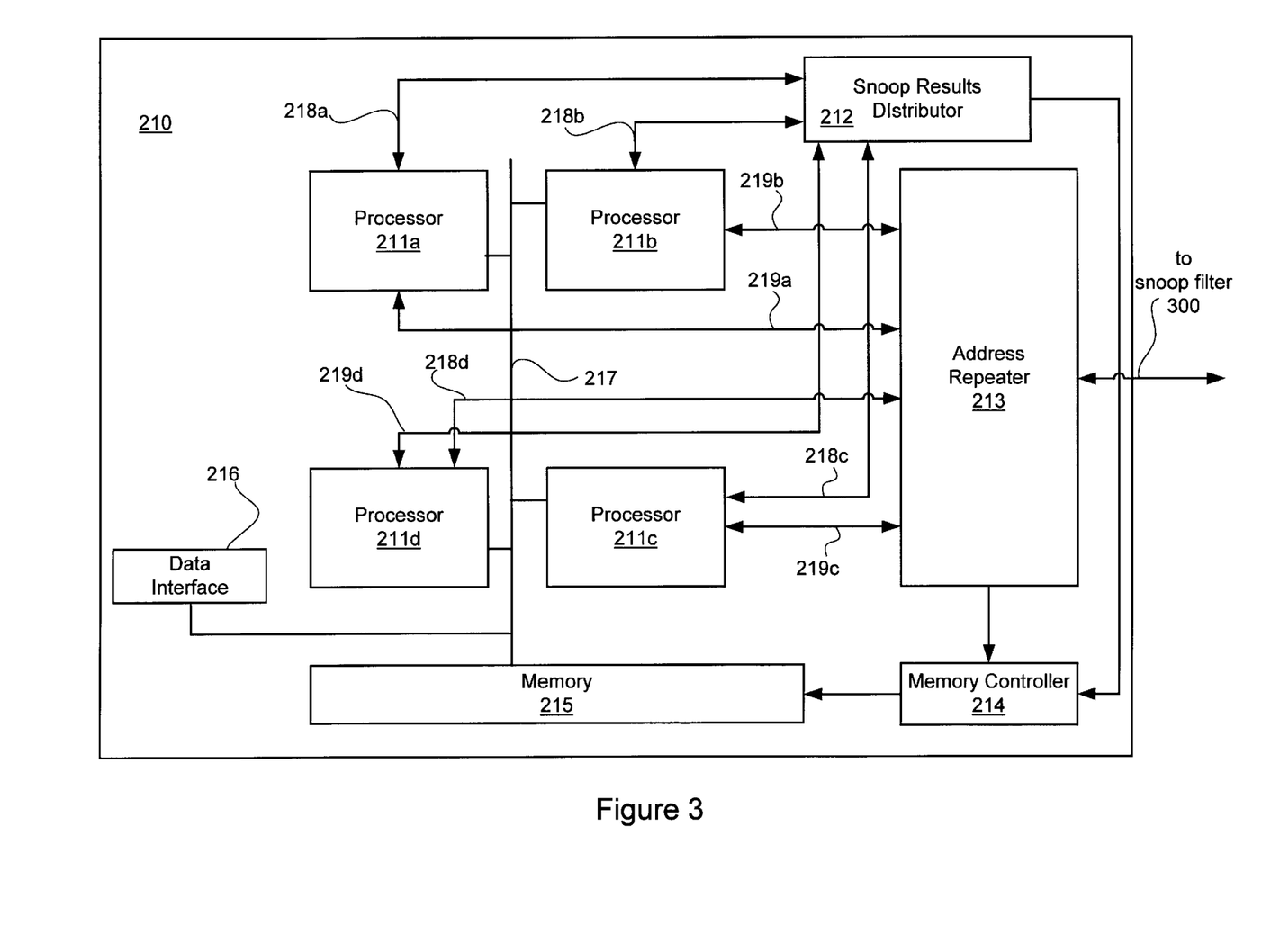
FIG. 3 is a detailed block diagram of a processor group of the multiprocessor computer system illustrated in FIG. 2

FIG. 3 is a detailed block diagram of processor group 210 of multiprocessor computer system 200 illustrated in FIG. 2. In this embodiment, the processor group 210 includes individual processors 211a, 211b, 211c, and 211d. However, it should be understood that the processor group 210 may include any suitable number of processors. During system operation, each one of processors 211a, 211b, 211c, or 211d can supply an address request to address repeater 213 by way of its respective bidirectional address bus 219a, 219b, 219c, and 219d. For example, processor 211b may drive an address request to address repeater 213 by way of bidirectional address bus 219b. In this embodiment, even though each processor in processor group 210 may generate an address request, address repeater 213 forwards only one address request for every cycle. This selection by the address repeater 213 of the address request to forward may be accomplished by use of a local arbitration algorithm as known in the art. In the described embodiment, when requested, each of the processors 211a, 211b, 211c, and 211d also send their individual snoop results to snoop results distributor 212 by way of connectors 218a, 218b, 218c, and 218d, respectively.

According to the present embodiment, snoop results distributor 212 also produces an input to memory controller 214 to assist with the retrieval of requested pages of memory from a memory 215. By way of example, during system operation, snoop results distributor 212 supplies a global snoop result to memory controller 214 which then, if appropriate, directs memory 215 to act in accordance with the memory command associated with the address request. In one embodiment, memory 215 will act upon the requester processor group's page address request by delivering the requested page of memory to a local processor (i.e., one of the processors 211a, 211b, 211c, and 211d) by way of connector 217 or to a non-local processor by way of data interconnect 270 and data interface 216.

Figure 4:
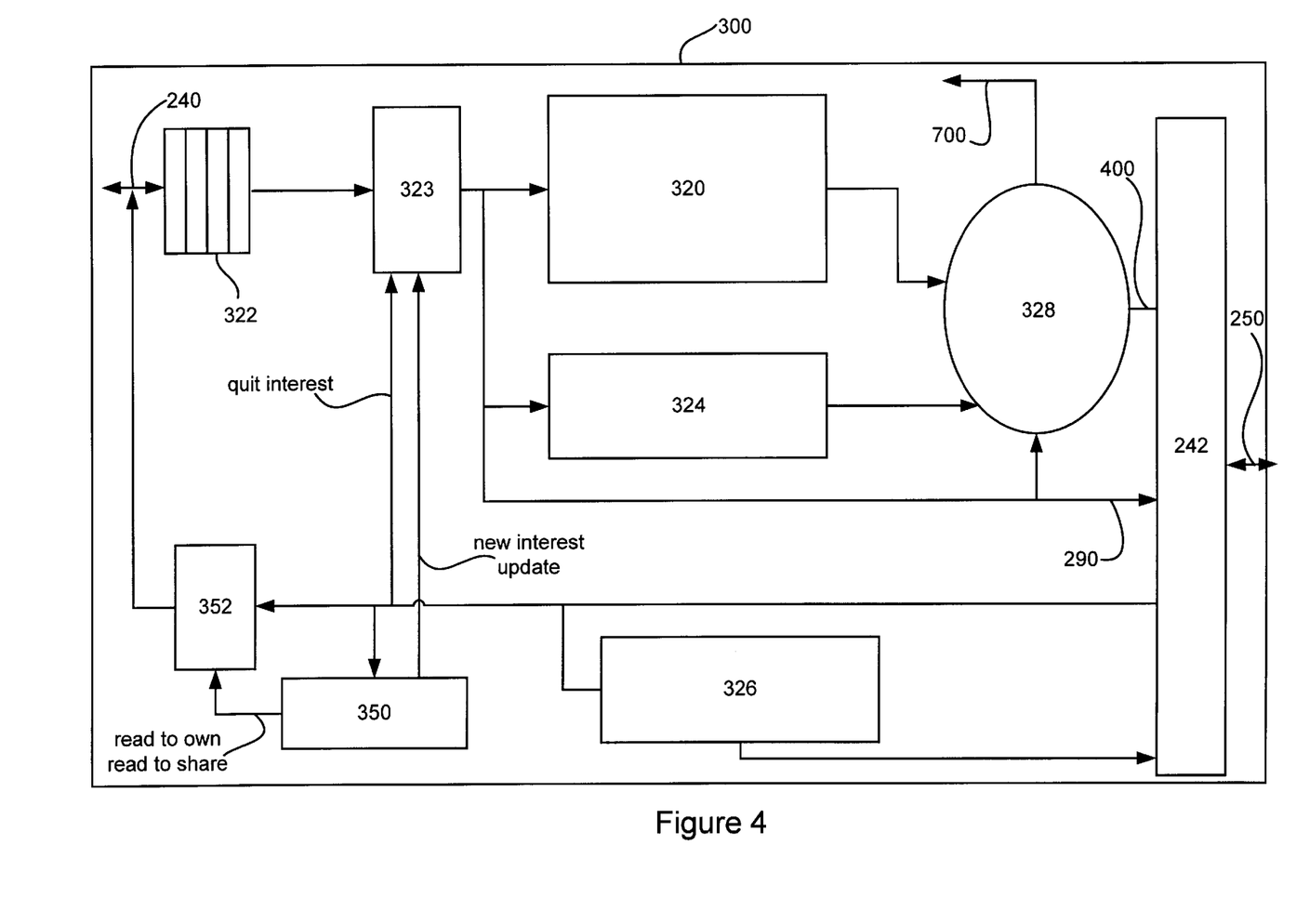
FIG. 4 is a block diagram of a snoop filter according to an embodiment of the invention.

FIG. 4 is a block diagram of snoop filter 300 according to an embodiment of the invention. The snoop filter 300 illustrated in FIG. 4 is an exemplary snoop filter that is associated with one of the plurality of groups of processors included in computer system 200 as each processor group has its own associated snoop filter. It should be understood that snoop filter 300 would be replicated for each of the other processor groups included in system 200.

The snoop filter 300 includes an input queue 322 to stage any address requests received from address repeater 213 by way of address bus interface 240. In this embodiment, certain address bits from input queue 322 define an index into an interest map 320 and an interest cache 324. A multiplexor 323 forwards a queued address request, a quit interest indicator or a new interest indicator to interest map 320, interest cache 324 and a bus interface 242 which is electrically connected to address interconnect 250. A decision logic block 328 is disposed to receive output data from both interest map 320 and interest cache 324 as well as the queued address request from input queue 322.

In this embodiment, a remote write map 326 is also included to write data into the interest map 320 and the interest cache 324. The remote write map 326 may include at least one bit per page of main memory that is local to an associated processor group. If the bit associated to a page of memory is set, then a non-local processor group has been granted ownership to at least one cache line of the page of memory. In one embodiment, remote write map 326 may take the form of a 64K×18 memory device logically configured as a 1 M×1 SRAM.

The snoop filter 300 also includes a page scrubber 350, and a multiplexor 352. Page scrubber 350 is disposed to perform a scrub operation on any memory pages with negative snoop results. A scrub operation is used to get rid of unwanted incoming address traffic. The page scrubber 350 observes incoming traffic and chooses an address for which the local processor group has no snoop result. The page scrubber 350 then starts a series of local reads during any unused cycles and then watches the selected page and if there is any outgoing transaction to this page of memory, or if there are any incoming transactions with a positive snoop, then the scrub of this page is aborted and a new page is chosen. The page scrubber 350 generates transactions local to the local group, inserted into otherwise empty cycles, for each line of this page. For each line of memory, first a Read to Share is generated and if no local owned copy is present, it is followed by a Read to Own to invalidate any shared copies in the associated processor group. The multiplexor 352 supplies the Read to Own and Read to Share commands from the page scrubber 350 to input queue 322. If, however, an owned copy is present, then the page scrub is aborted an a new page is chosen. If the page scrub does in fact reach the end of the page, a quit interest transaction is generated thereby updating the associated interest maps and interest caches.

In another embodiment, a software scrub is performed by writing a control register in the snoop filter causing the scrubber to generate a second type of quit interest transaction, This is done after the operating system has loaded a page from disk, or zeroed a page, or copied over it with transactions that cause all caches to be invalidated.

In this embodiment, a quit interest transaction, of which there are two types, is generated by the page scrubber 350. In the first type, the page scrubber 350 generates a transaction which causes the local processor group to lose interest in a non-local page of memory. In the second type, a quit interest transaction is created which results in all non-local groups losing interest in a local page of memory.

In this embodiment, decision logic block 328 often generates an interest mask 400 which is communicated to address interconnect 250 by way of bus interface 242. In certain situations, decision logic block 328 may generate a pipe hold signal 700 which is driven back to pipeline hold circuitry (not shown). The pipe hold signal has the effect of temporarily halting any pipeline operations by holding input queue 322 and any pipeline stages in interest map 320 and the input to decision block 328 in its own snoop filter until an interest mask is created for the requested page of memory.

Interest map 320 may take the form of a SRAM device or other suitable memory device capable of dynamic data storage and retrieval. In one embodiment, interest map 320 may take the form of a 64K×18 device logically configured as an 8 M×1 SRAM. Preferably, the interest map 320 includes at least one interest bit per page of main memory and is configured in such a manner as to comprehend local and non-local pages of memory. In the described embodiment, each interest bit corresponds to an 8K page of memory.

In operation, at least one interest bit in interest map 320 associated with each local page of main memory is set if a processor residing in a non-local processor group has previously done an operation on the requested local page of memory. Alternatively, at least one interest bit is set for each non-local page of main memory if a processor residing in the local processor group has ever done an operation on the requested non-local page of memory.

Figure 5:
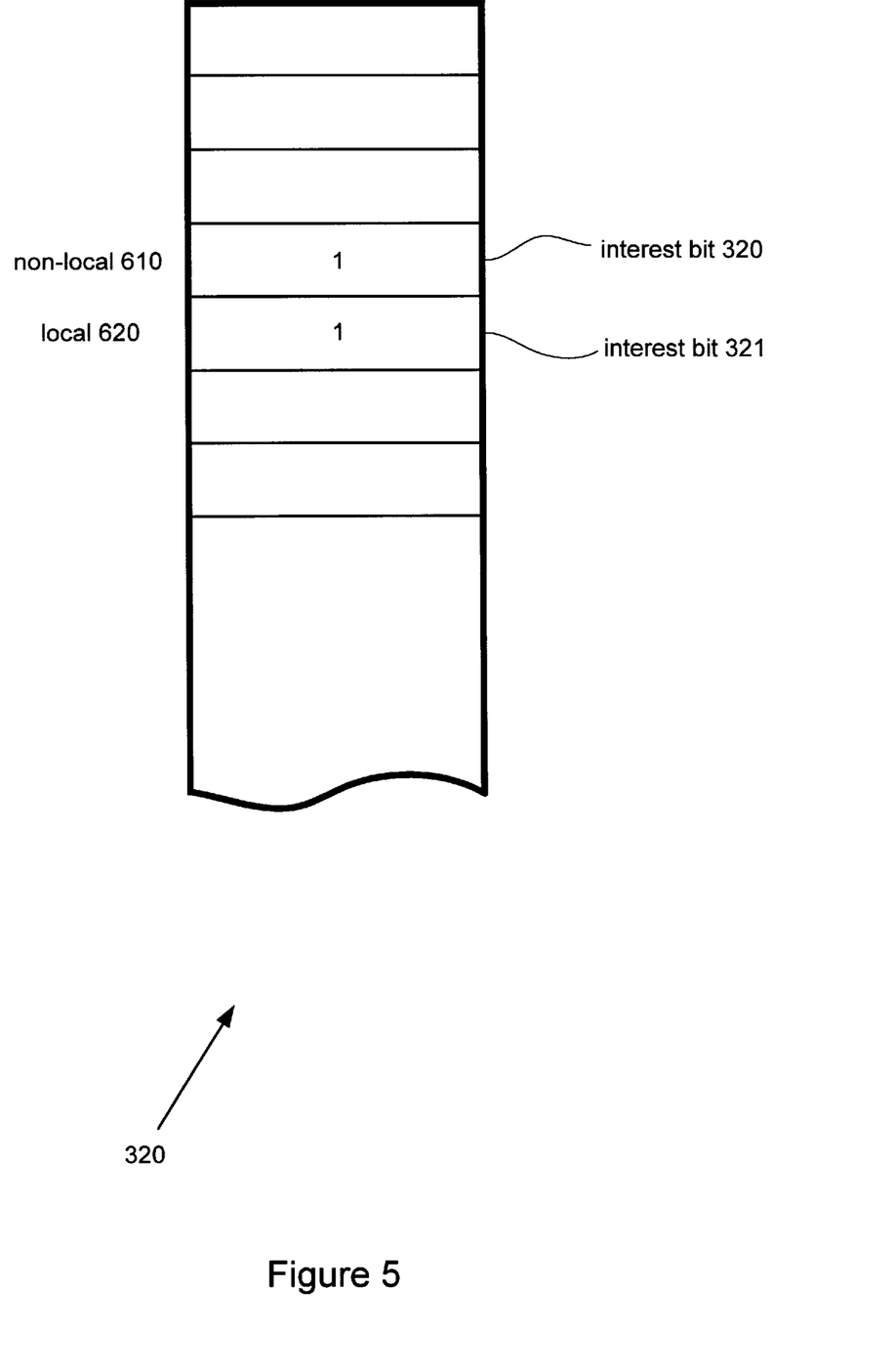
FIG. 5 is a diagram illustrating an interest map according to an embodiment of the invention.

By way of example, FIG. 5 illustrates an exemplary interest map 320. Interest map 320 is assumed to be associated with processor group 210. Interest map 320 includes a number of interest bits, including interest bit 321 and interest 322. Interest bit 321 is associated with a non-local page address 610 (i.e., resides in memory outside of group 210) and interest bit 322 is associated with a local page address 620 (i.e., resides in processor group 210). If in this example, interest bit 321 is set to logical one as shown (i.e., set may also refer to set to logical zero), then at least one processor within processor group 210 has some interest in non-local page address 610. Alternatively, if an interest bit 322 in interest map 320 is set to a logical one, then at least one processor outside group 210 has some interest in local page address 620.

Figure 6:
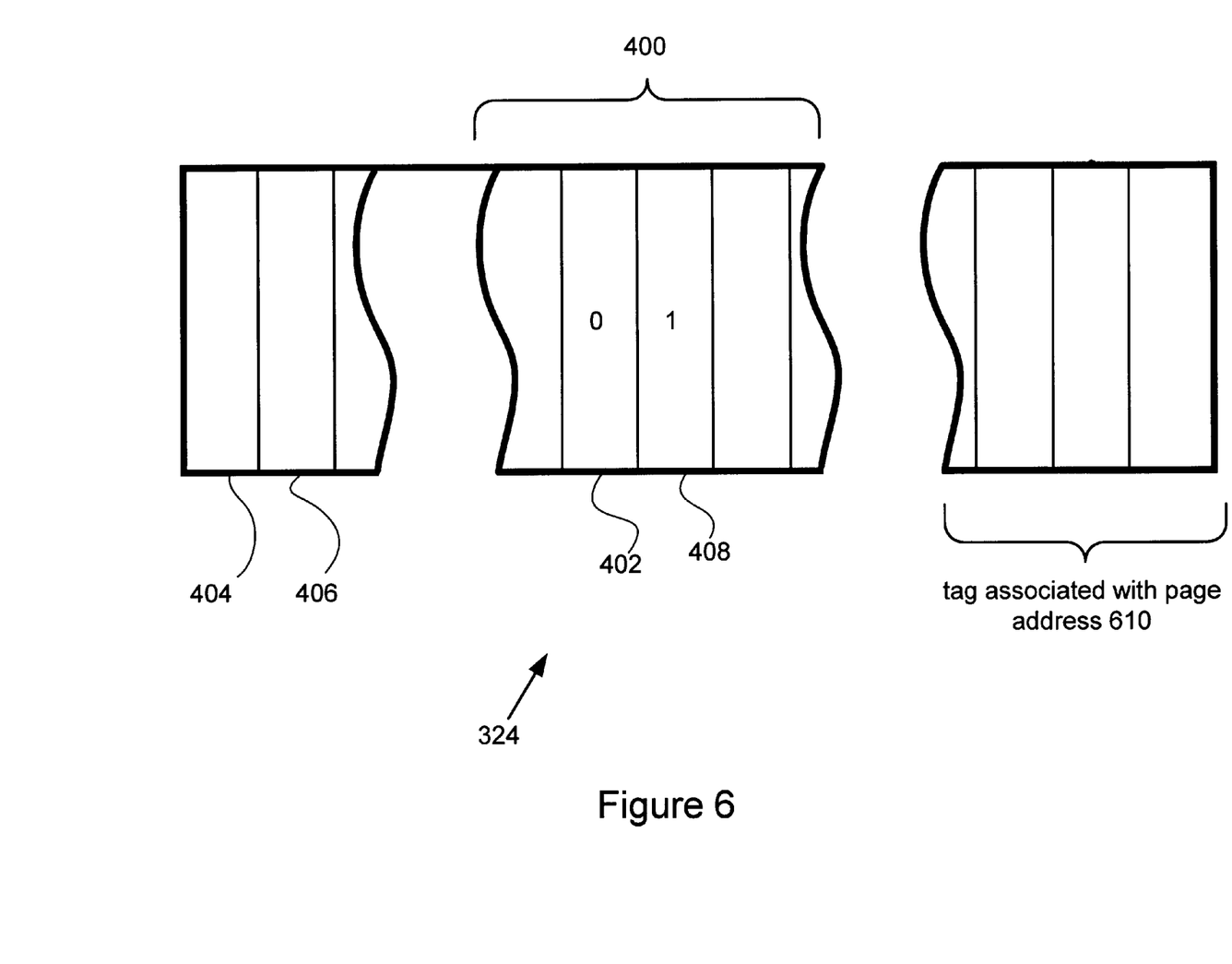
FIG. 6 is a diagram illustrating an interest cache according to an embodiment of the invention.

FIG. 6 is an exemplary representation of an interest cache 340 associated with interest map 320 and processor group 210 according to an embodiment of the invention. Preferably each interest cache is associated with an interest map as well as a processor group. The interest cache is generally organized as a direct-mapped or set-associate cache of those page addresses in the interest map that the associated processor group has shared with non-local processor groups.

Each page address included in the interest cache 340 is associated with an interest mask. The interest mask includes a single group interest bit 402 for each of the processor groups within the multiprocessor system 200. Each group interest bit indicates the interest of the associated processor group in the requested page address.

Additional bits required to facilitate the operation of the snoop filter within system may be provided in the interest cache 340. For example, an update bit 404 may be added to indicate new interest in the associated page of memory, or in yet another embodiment, a "remote write is OK" bit 406 may be added to indicate the associated page address has had at least one cache line owned by a non-local processor group.

By way of example as shown in FIG. 6, interest cache 340 includes an interest mask 400 associated with non-local page address tag 610. In this embodiment, interest mask 400 includes group interest bits for all processor groups in system 200. As described above, since page address-tag. 610 is non-local with reference to processor group 210 and the interest bit 321 is set, then processor group 210 has an interest in page address tag 610. In this case, the group interest bit 408 associated with processor group 210 in interest mask 400 is set to indicating an interest by processor group 210 in non-local page address 610.

Referring to FIGS. 4–6, the operation of snoop filter 300 is described. In one embodiment, processor group 210 forwards address request associated with local page address 610 to address repeater 213. Address repeater 213 then forwards the address request to input queue 322 of snoop filter 230 by way of address repeater bus interface 240.

Once the address request is released from the input queue 322, snoop filter 300 determines whether interest bit 321 in interest map 320 associated with local page address 610 is set or not set. In this example, the interest bit 321 for local page address 610 is set, thus an associated interest mask (based on previous operations not yet comprehending the new address request) will be retrieved from interest cache 340 and forwarded to decision block 328 along with data retrieved from interest map 320. Decision logic 328 will generate interest mask 400 for the address request. Decision logic 328 will forward interest mask 400 to address interconnect 250 by way of bus interface 242 where it will be combined with the address request and the associated memory command.

Figure 7A:
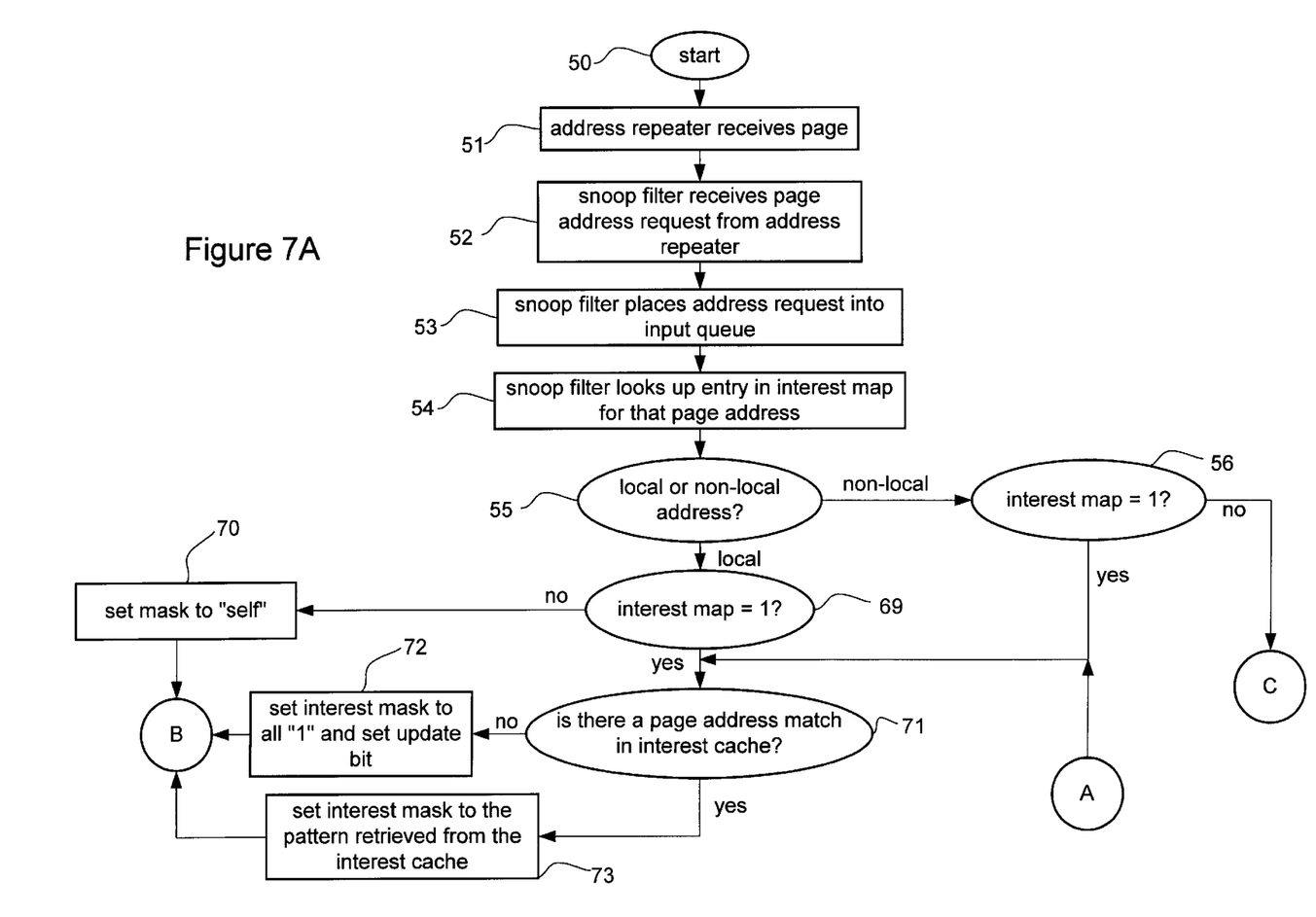
FIGS. 7A–7C is a flowchart detailing filtered snoop processing of a single memory address request transaction in a multiprocessor computer system according to an embodiment of the invention.
Figure 7B:
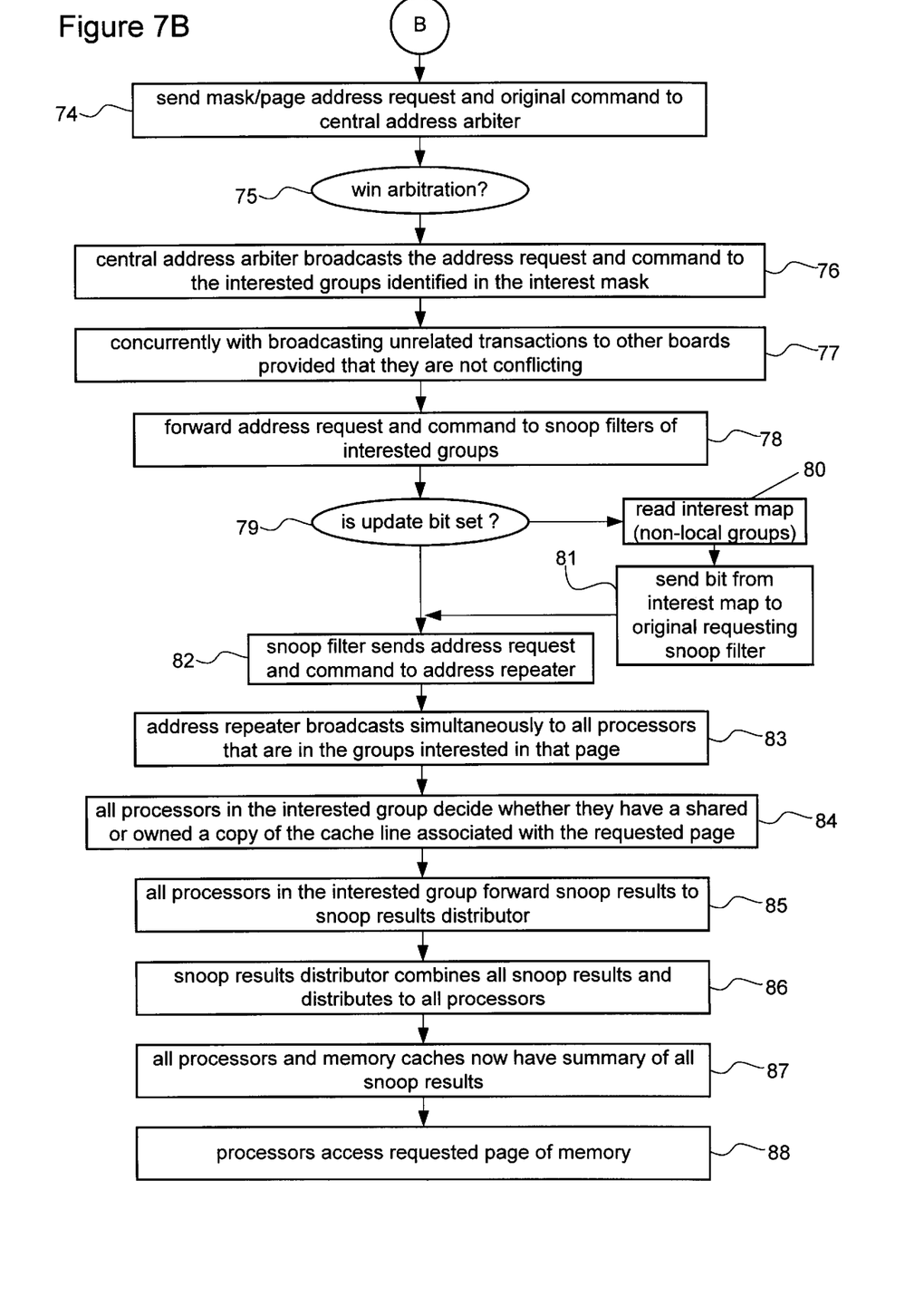
Figure 7C:
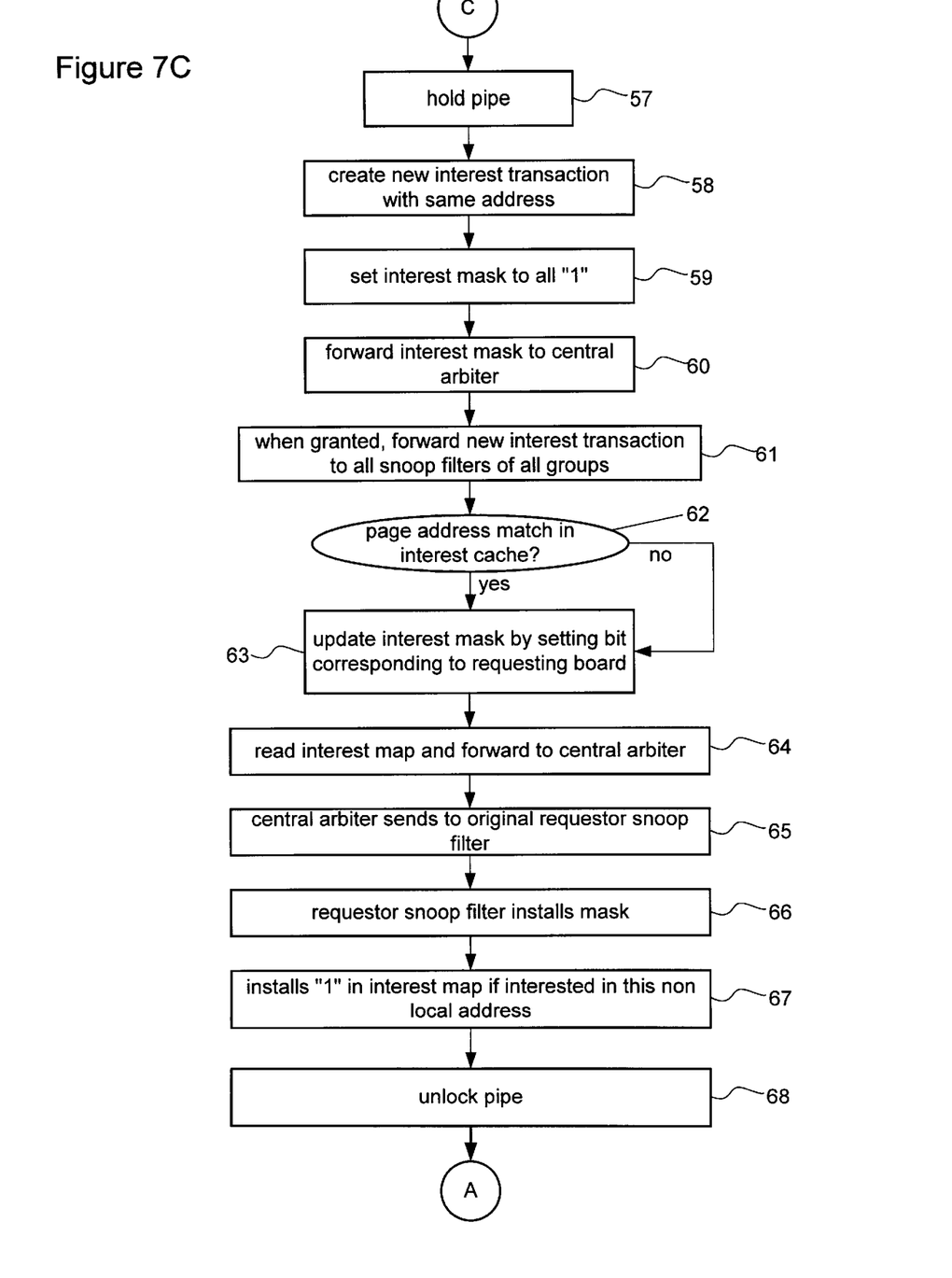

FIGS. 7A–7C are flowcharts detailing filtered processing 700 of a single memory address request transaction in a multiprocessor computer system 200 according to an embodiment of the invention. In the following discussion, it should be noted that in general processor groups of the multiprocessor computer system 200 substantially simultaneously generate address requests. For clarity of discussion, the filtered snoop processing 700 is described as carried out for single address request from processor group 210.

The lifecycle of a memory address request begins with an individual processor within a group of processors generating a request for a page of memory with an associated memory address. Referring to FIG. 7A, the address repeater associated with the group of processors which includes the original requester processor will receive the memory page address request 51. The snoop filter associated with the requester group of processors will receive 52 the memory page address request. Once the requested memory page address is received by the snoop filter, an interest map associated with the snoop filter will be retrieved 54. Next the decision logic block determines 55 whether the memory page address is a local or a non-local address. If it is determined that the address is local, the interest map will again be queried 69 to determine if the entry associated with the requested page of memory is a zero or a one. If it is determined that the entry in the interest map associated with the requested page of memory is zero, then the logic block associated with the snoop filter will set 70 the interest mask for the requested page of memory to a "self state" by setting all interest bits for all groups to zero except the requester group of processors which it sets to a one. In this manner, the address request is echoed back to the originator group of processors only so as to maintain priority coherency.

On the other hand, if it is determined that the entry in the interest map associated with the requested page of memory is one, then the interest cache associated with the snoop filter is queried 71 to determine if the requested page address is included in the interest cache. If it is determined that the requested page of memory is not included in the interest cache, then the update bit is set concurrently with setting 72 all interest bits in the interest mask to one. In this manner, all groups of processors will receive the page address request as a special transaction since the update bit has been set. If, however, it is determined that the page address request is included in the interest cache, then the logic block sets 73 an interest mask to the pattern retrieved from the interest cache.

If the requested page address is determined 55 to be non-local to the requester group of processors, the decision logic block determines 56 if the entry associated with the requested page of memory is zero or one. However, if it is determined to be one, then the procedure is the same as for a local address. Referring now to FIG. 7C, if it is determined that the entry in the interest map for the requested page address is zero then the logic block generates a hold pipe signal 52. The hold pipe signal has the effect of suspending all transactions for the requester group of processors. In this manner, a new interest transaction is created whereby the requester group of processors is telling all other groups of processors that it is now interested in the requested page of memory which until now it was uninterested. The new interest transaction begins by the logic block setting 59 all interest bits in the interest mask associated with the requested page of memory to ones. The interest mask is then forwarded 60 to the central address interconnect wherein is contained the central address arbiter. The central address arbiter will then prioritize all received address requests and chose one request based upon the system arbitration algorithm. When the central address arbiter has granted the request it will forward 61 the new interest transaction to all non-local snoop filters. Each non-local snoop filter will query 62 their respective interest cache to determine if the requested page of memory is included within. If the address of the requested page of memory is included within the associated interest cache, each non-local snoop filter will update 63 their respective interest masks by setting the bit associated with the requesting board to one. Next, each non-local snoop filter will read 64 their interest map and forward the result to the central address arbiter. The central address arbiter will send 65 send the results from all non-local snoop filters to the snoop filter associated with the requester group of processors which cumulates and installs 66 the new interest mask into its interest cache and installs 67 a one in the associated interest map. Finally, the logic block sends 68 an unlock pipe signal which has the effect of unlocking the pipe for the requester group of processors. Once the pipe has been unlocked, the requester group of processors is now able to follow the same procedure.

Next, referring to FIG. 7B, the snoop filter sends 74 the updated interest mask along with the memory page address request and original command to the central address arbiter contained within the address interconnect. The central address arbiter then broadcasts 76 the address request and associated command to the snoop filters of interested groups of processors concurrently 77 with unrelated transactions to the snoop filters of other groups of processors. Each snoop filter of each interested group of processors will then determine 79 whether the update bit is set or not set. If it is determined that the update bit is set, the snoop filter will read 80 the associated interest map and sends 81 the bit from the interest map associated with the requested page of memory to the snoop filter associated with the original requester group of processors.

Each snoop filter associated with each interested group of processors will simultaneously forward 82 the address request to all snoop filters associated with the interested groups of processors. Each address repeater will then simultaneously broadcast 83 to all processors included within the interested group of processors. Each of the individual processors in the interested group of processors will decide 84 whether they have a shared or owned copy of the requested page. All individual processors in the interested group of processors will forward 85 their snoop results to the snoop results to the associated snoop results distributor. The associated snoop results distributor will then combine 86 all received individual snoop results to form a group snoop result. Each snoop results distributor will distribute 87 the group snoop result to all interested snoop results distributors associated with interested groups of processors included in system 200. Thereafter, processors access 88 the requested page of memory.

In the described embodiment, address interconnect 250 may perform any required conflict arbitration between any conflicting address requests and choose an appropriate address request to broadcast. In this embodiment, an arbitration algorithm will typically have a highest priority processor group. On any given cycle, the algorithm will look to see how many processor groups have outstanding requests and determine which processor groups has the highest priority. The arbitration algorithm will then choose the first unsatisfied processor groups with the highest priority or the processor groups immediately after the first processor groups in a circular order. Once a request has been granted, the processor groups is now assigned the lowest priority and the processor groups that was previously next in line is now assigned the highest priority. In yet another embodiment, another arbitration algorithm may apply.

After the conflict arbiter has chosen an address request, address interconnect 250 broadcasts simultaneously in lock-step the chosen address request (address request 290, for example) to all address repeaters associated with the interested processor groups concurrently with any non-conflicting transactions to the address repeaters associated with the uninterested processor groups.

Once the chosen address request 290 is received by each of the individual processors within each interested processor group, each individual processor will generate its own individual snoop result by querying its own memory cache. In this manner, determining whether it has shared or owned a copy of the requested block of memory. Upon such a determination, each one of processors will forward its own snoop result to the snoop results distributor associated with that group. The snoop results distributor will thereupon cumulate the received individual snoop results into a group snoop result and transmit the group snoop result to all snoop results distributors in interested groups within system 200. Concurrent with the transmitting, each snoop results distributor will receive and cumulate all group snoop results from all other interested processor groups in system 200 to form a global snoop result. The global snoop result will be forwarded to all interested processors and memory controllers within system 200.

By way of example, processors 211a–211d will generate individual snoop results by querying their respective memory caches (not shown) and forwarding the result to snoop results distributor 212 by way of connectors 218a–218d, respectively. Snoop results distributors 212 will combine the individual processor snoop results into a group snoop result and thereupon transmit the group snoop result to all other interested processor groups. Substantially simultaneously, the snoop results distributor 212 will receive group snoop results from all other snoop results distributors in system 200. Upon the final cumulation of all group snoop results into a global snoop result, snoop results distributors 212 will forward the global snoop results to each one of the processors 211a–211d and the memory controller 214. Memory controller 214 will then direct memory 215 to act in accordance with the associated memory command.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for distributing address requests among a plurality of groups of processors in a multiprocessor computer system, said method comprising:

receiving an address request at a first group of processors, the address request being associated with a memory address corresponding to a requested memory page;

identifying those of the groups of processors that are interested in the address request and identifying those of the groups of processors that are uninterested in the address request;

substantially simultaneously broadcasting the address request to the interested groups of processors and not to the uninterested groups of processors;

identifying at least one non-conflicting address request requiring distribution to only at least one of the uninterested groups of processors; and distributing the at least one non-conflicting address request to the at least one of the uninterested groups of processors substantially simultaneously with said broadcasting.

2. A method as recited in claim 1, wherein the address request includes a command and a memory address.

3. A method as recited in claim 1, wherein said identifying comprises:

obtaining an interest mask that identifies those of the groups of processors that are interested in the address request.

4. A method as recited in claim 3, wherein said broadcasting operates to broadcast the address request to the interested groups of processors and not to the uninterested groups of processors based on the interest mask.

5. A method as recited in claim 1, wherein said method further comprises:

obtaining a snoop result for each one of the interested groups of processors; and broadcasting the snoop result from each one of the interested groups of processors to the first group of processors.

6. A method as recited in claim 5, wherein said obtaining of the snoop result operates to snoop a data storage device at each of the interested groups of processors.

7. A method as recited in claim 1, wherein said identifying comprises:

providing an interest map within the multiprocessor computer system, the interest map being capable of storing an interest bit associated with each one of the memory pages contained within the multiprocessor computer system, the interest bit bring determinative of whether any group of processors are interested in the associated memory page; and providing an interest cache within the multiprocessor computer system, the interest cache being capable of identifying the memory address of those memory pages being shared by an associated group of processors and at least one other group of processors that is interested in the requested memory page.

8. A method as recited in claim 7, wherein said method further comprises:

determining whether the address of the memory page is a non-local memory address; and querying the interest map to determine if any group of processors are interested in the requested memory page when it is determined the memory page has a non-local memory address.

9. A method as recited in claim 8, wherein said method further comprises:

creating a new interest transaction for the memory address corresponding to the requested memory page when it is determined the memory page has a non-local memory address and when said querying the interest map determines that none of the groups of processors are interested in the requested memory page;

forwarding a predetermined interest mask for the local group of processors to all other groups of processors;

determining which of the non-local groups of processors are interested in the requested memory page;

updating the interest mask each of the non-local groups of processors which are determined to be interested in the requested memory page by setting the bit in the associated interest mask to a predetermined logical state; and updating the interest mask for the associated group of processors based on the interest bits from the other of the groups of processors.

10. A method as recited in claim 7, wherein said identifying further comprises:

querying the interest map to determine if any group of processors is interested in the requested memory page;

querying the interest cache to determine if the address of the requested memory page is contained therein when said querying of the interest map determines that at least one other groups of processors are interested in the requested memory page; and retrieving the interest mask associated with the address of the requested memory page from the interest cache when it is determined the address of the requested memory page is contained within the interest cache.

11. A method as recited in claim 10, wherein said identifying further comprises:

setting the interest mask to a self state, wherein a bit associated with the associated group of processors is set when said querying of the interest map determines that no other group of processors is interested in the requested memory page.

12. A method as recited in claim 10, wherein said identifying further comprises:

setting the interest mask to all ones and setting an update bit to the interest cache when it is determined the address of the requested memory page is not contained within the interest cache.

13. A method as recited in claim 12, wherein said method further comprises:

determining if the update bit is set; and obtaining the interest bit for the requested memory page from all of the groups of processors and forwarding the obtained interest bits to one of the groups of processors when the update bit is determined to be set.

14. A multiprocessor computer system, comprising:

a plurality of groups of processors, the plurality of groups of processors including at least, a first group of processors which receives an address request, the address request being associated with a memory address corresponding to a requested memory page, an interested group of processors, the interested group of processors including those of the groups of processors that are interested in the address request, and an uninterested group of processors, the uninterested group of processors including those of the groups of processors that are not interested in the address request;

a plurality of address repeaters, each of the address repeaters being associated with one of the groups of processors, each of the address repeaters being capable of receiving and broadcasting an address request;

a plurality of snoop filters, each of the snoop filters being associated with one of the group of processors, each of the snoop filters being capable of identifying the interested groups of processors and the uninterested groups of processors; and an address interconnect, the address interconnect being electrically connected to each of the snoop filter associated with each of the group of processors, the address interconnect being capable of substantially simultaneously broadcasting the address request to the interested groups of processors and not to the uninterested groups of processors, wherein the address interconnect further comprises a conflict arbiter that resolves conflicts between address requests, and wherein the address interconnect operates to identify at least one non-conflicting address request requiring distribution to only at least one of the uninterested groups of processors, the at least one non-conflicting address request is distributed to the at least one of the uninterested groups of processors substantially simultaneously with the broadcast of the address request to the interested groups of processors.

15. A multiprocessor computer system as recited in claim 14 wherein said multiprocessor computer system further comprises:

a plurality of snoop results distributors, each of the snoop results distributors being associated with one of the group of processors, each of the snoop results distributors being electrically connected to a memory cache associated with the associated group of processors, and each of the snoop results distributors being capable of receiving and forwarding a snoop result from other groups of processors.

16. A multiprocessor computer system as recited in claim 14 wherein the snoop filter associated with each of the group of processors comprises:

an interest map storage device capable of storing an interest bit associated with each one of the memory pages contained within the computer system, the interest bit is determinative of whether any group of processors are interested in the associated memory page.

17. A multiprocessor computer system as recited in claim 14 wherein the snoop filter associated with each of the group of processors further comprises:

an interest cache storage device capable of identifying the memory address of those memory pages shared by the associated group of processors and at least one other group of processors that is interested in the requested memory page.

18. A multiprocessor computer system as recited in claim 14 wherein said interested group of processors further includes at least one processor which has requested a line of memory associated with the requested page of memory.

19. A multiprocessor computer system as recited in claim 14 further comprising a scrubber for generating a quit interest transaction for at least one of those of the groups of processors that are interested in the address request.

20. A multiprocessor computer system as recited in claim 19 wherein the quit interest transaction causes the at least one of those of the groups of processors that are interested in the address request to lose interest in the address request.

* * * * *